(12) United States Patent
Tokunaga et al.

(10) Patent No.: US 11,933,405 B2
(45) Date of Patent: Mar. 19, 2024

(54) SLIDING COMPONENT

(71) Applicant: Eagle Industry Co., Ltd., Tokyo (JP)

(72) Inventors: Yuichiro Tokunaga, Tokyo (JP); Tadatsugu Imura, Tokyo (JP); Hiroshi Suzuki, Tokyo (JP); Iwa Ou, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 96 days.

(21) Appl. No.: 17/428,909

(22) PCT Filed: Feb. 12, 2020

(86) PCT No.: PCT/JP2020/005260
§ 371 (c)(1),
(2) Date: Aug. 5, 2021

(87) PCT Pub. No.: WO2020/166590
PCT Pub. Date: Aug. 20, 2020

(65) Prior Publication Data
US 2022/0128092 A1    Apr. 28, 2022

(30) Foreign Application Priority Data
Feb. 14, 2019 (JP) .................................. 2019-024901

(51) Int. Cl.
*F16J 15/34* (2006.01)
*F16C 17/02* (2006.01)
*F16C 33/74* (2006.01)

(52) U.S. Cl.
CPC ......... *F16J 15/3412* (2013.01); *F16J 15/342* (2013.01); *F16C 17/02* (2013.01); *F16C 33/74* (2013.01); *F16J 15/3416* (2013.01)

(58) Field of Classification Search
CPC .... F16J 15/3408; F16J 15/3412; F16J 15/342; F16J 15/3424
See application file for complete search history.

(56) References Cited

U.S. PATENT DOCUMENTS

| 3,085,808 A | 4/1963 | Williams ...................... 277/388 |
| 3,232,680 A | 2/1966 | Clark ............................ 384/110 |

(Continued)

FOREIGN PATENT DOCUMENTS

| CN | 1364987 | 8/2002 | ............... F16J 15/40 |
| CN | 2534429 | 2/2003 | ............... F16J 15/40 |

(Continued)

OTHER PUBLICATIONS

Chinese Office Action issued in application No. 201980087670.2 (with translation), dated Jul. 1, 2022 (17 pgs).

(Continued)

*Primary Examiner* — Nicholas L Foster
(74) *Attorney, Agent, or Firm* — HAYES SOLOWAY P.C.

(57) ABSTRACT

A sliding component includes: a dynamic pressure generation groove provided in a sliding surface of the sliding component, the dynamic pressure generation groove having a first end forming a closed end and a second end forming an inlet communicating with any one side of a sealed fluid side and a leakage side in a radial direction; and a deep groove provided in the sliding surface and deeper than the dynamic pressure generation groove, an inlet 16a of the deep groove communicating with an inlet of the dynamic pressure generation groove on a side of a side wall of the dynamic pressure generation groove, the side wall being circumferentially opposite to a dynamic pressure generation wall constituting another side wall of the dynamic pressure generation groove.

16 Claims, 8 Drawing Sheets

(56) References Cited

U.S. PATENT DOCUMENTS

| | | | |
|---|---|---|---|
| 3,410,565 A | 11/1968 | Williams | 277/348 |
| 3,466,052 A | 9/1969 | Ludwig | |
| 3,499,653 A | 3/1970 | Gardner | 277/27 |
| 3,527,465 A | 9/1970 | Guinard | 277/400 |
| 3,656,227 A | 4/1972 | Weinand | 29/530 |
| 3,675,935 A | 7/1972 | Ludwig | F16J 15/342 |
| 3,782,737 A | 1/1974 | Ludwig | |
| 3,804,424 A | 4/1974 | Gardner | 277/27 |
| 3,855,624 A | 12/1974 | Reinhoudt | F16C 17/045 |
| 3,870,382 A | 3/1975 | Reinhoudt | F16C 17/045 |
| 4,406,466 A | 9/1983 | Geary, Jr. | 277/347 |
| 4,486,026 A | 12/1984 | Furumura et al. | 277/80 |
| 4,523,764 A | 6/1985 | Albers | F16J 15/342 |
| 4,645,414 A | 2/1987 | DeHart | F04D 17/161 |
| 5,092,612 A | 3/1992 | Victor | 277/400 |
| 5,133,562 A | 7/1992 | Lipschitz | F16J 15/342 |
| 5,201,531 A | 4/1993 | Lai | F16J 15/3412 |
| 5,222,743 A | 6/1993 | Goldswain | 277/400 |
| 5,385,409 A | 1/1995 | Ide | F16J 15/3432 |
| 5,441,283 A | 8/1995 | Pecht et al. | 277/96.1 |
| 5,447,316 A | 9/1995 | Matsui | F16J 15/34 |
| 5,492,341 A | 2/1996 | Pecht | 277/400 |
| 5,496,047 A | 3/1996 | Goldswain | F16J 15/3412 |
| 5,498,007 A | 3/1996 | Kulkarni | 277/366 |
| 5,501,470 A | 3/1996 | Fuse | 277/400 |
| 5,529,318 A | 6/1996 | Fuse | F16J 15/3412 |
| 5,556,111 A | 9/1996 | Sedy | 277/96.1 |
| 5,605,339 A | 2/1997 | Pecht | F16J 15/3412 |
| 5,664,787 A | 9/1997 | Fuse et al. | F16J 15/34 |
| 5,702,110 A | 12/1997 | Sedy | |
| 5,895,051 A | 4/1999 | Bowers | B62D 5/22 |
| 6,142,478 A | 11/2000 | Pecht | F16J 15/3484 |
| 6,189,896 B1 | 2/2001 | Dickey et al. | F16L 17/06 |
| 6,446,976 B1 | 9/2002 | Key | 277/367 |
| 6,575,470 B1 | 6/2003 | Gacek | F16J 15/3412 |
| 6,817,766 B2 | 11/2004 | Gomyo | F16C 32/06 |
| 7,044,470 B2 | 5/2006 | Zheng | F16J 15/342 |
| 7,510,330 B2 | 3/2009 | Obara | F16C 32/06 |
| 7,568,839 B2 | 8/2009 | Gotoh et al. | F16C 32/06 |
| 7,744,094 B2 | 6/2010 | Yanagisawa | F16J 15/342 |
| 7,758,051 B2 | 7/2010 | Roberts-Haritonov et al. F16J 15/34 | |
| 7,780,399 B1 | 8/2010 | Garrison | F01D 25/183 |
| 8,162,322 B2 | 4/2012 | Flaherty | F16J 15/3412 |
| 9,062,775 B2 | 6/2015 | Short et al. | F16J 15/34 |
| 9,353,865 B2 | 5/2016 | Lattin | F16N 21/00 |
| 9,353,867 B2 | 5/2016 | Itadani | F16J 15/342 |
| 9,371,912 B2 | 6/2016 | Hosoe et al. | F16J 15/34 |
| 9,587,745 B2 | 3/2017 | Itadani et al. | F16J 15/3412 |
| 9,611,938 B1 | 4/2017 | Itadani | F16J 15/3416 |
| 9,677,670 B2 | 6/2017 | Itadani et al. | F16J 15/3412 |
| 9,829,109 B2 | 11/2017 | Itadani et al. | F16J 15/3412 |
| 9,845,886 B2 | 12/2017 | Itadani | F16C 17/045 |
| 9,951,873 B2 | 4/2018 | Inoue et al. | F16J 15/34 |
| 9,982,784 B2 | 5/2018 | Osada et al. | F16J 15/34 |
| 10,054,230 B2 | 8/2018 | Katori | F16J 15/34 |
| 10,072,759 B2 | 9/2018 | Inoue et al. | F16J 15/34 |
| 10,113,648 B2 | 10/2018 | Inoue et al. | F16J 15/342 |
| 10,190,689 B2 | 1/2019 | Yoshida | F16J 15/3412 |
| 10,337,560 B2 | 7/2019 | Takunaga | F16C 33/80 |
| 10,337,620 B2 | 7/2019 | Tokunaga et al. | F16J 15/342 |
| 10,352,450 B2 | 7/2019 | Yamanaka et al. | F16J 15/3204 |
| 10,408,349 B2 | 9/2019 | Miyazaki | F16J 15/3272 |
| 10,473,220 B2 | 11/2019 | Tokunaga et al. | F16J 15/342 |
| 10,487,944 B2 | 11/2019 | Itadani | F16J 15/3496 |
| 10,487,948 B2 | 11/2019 | Inoue et al. | F16J 15/342 |
| 10,495,228 B2 | 12/2019 | Itadani et al. | F16J 15/34 |
| 10,648,569 B2 | 5/2020 | Itadani | F16K 15/34 |
| 10,655,736 B2 | 5/2020 | Itadani | F16J 15/3416 |
| 10,704,417 B2 | 7/2020 | Tokunaga et al. | F01D 25/16 |
| 10,781,924 B2 | 9/2020 | Inoue et al. | F16J 15/342 |
| 10,883,603 B2 | 1/2021 | Inoue et al. | F16J 15/342 |
| 10,883,604 B2 | 1/2021 | Inoue et al. | F16J 15/342 |
| 11,009,072 B2 | 5/2021 | Kimura et al. | F16J 15/34 |
| 11,009,130 B2 | 5/2021 | Itadani | F16J 15/3284 |
| 11,125,335 B2 | 9/2021 | Kimura et al. | F16J 15/34 |
| 11,221,071 B2 | 1/2022 | Sasaki | F16C 17/04 |
| 11,525,512 B2 | 12/2022 | Kimura | F16J 15/3412 |
| 11,530,749 B2 | 12/2022 | Kimura | F16J 15/441 |
| 11,603,934 B2 * | 3/2023 | Imura | F16J 15/3412 |
| 11,644,100 B2 | 5/2023 | Kimura | F16J 15/324 |
| 2002/0093141 A1 | 7/2002 | Wang | 277/358 |
| 2003/0178781 A1 | 9/2003 | Tejima | |
| 2004/0080112 A1 | 4/2004 | Tejima | 277/306 |
| 2005/0135714 A1 | 6/2005 | Rahman | F16C 17/107 |
| 2005/0141789 A1 | 6/2005 | Kita et al. | F16C 32/06 |
| 2005/0212217 A1 | 9/2005 | Tejima | 277/399 |
| 2006/0093245 A1 | 5/2006 | Han | G11B 19/2018 |
| 2007/0296156 A1 | 12/2007 | Yanagisawa et al. | F16J 15/34 |
| 2008/0100001 A1 | 5/2008 | Flaherty | 277/400 |
| 2008/0272552 A1 | 11/2008 | Zheng | 277/400 |
| 2010/0066027 A1 | 3/2010 | Vasagar | 277/350 |
| 2011/0101616 A1 | 5/2011 | Teshima | 277/358 |
| 2012/0018957 A1 | 1/2012 | Watanabe | 277/387 |
| 2013/0189294 A1 | 7/2013 | Koelle | F16J 15/34 |
| 2013/0209011 A1 | 8/2013 | Tokunaga | F16C 32/0633 |
| 2014/0203517 A1 | 7/2014 | Ferris | F16K 15/3412 |
| 2015/0115537 A1 | 4/2015 | Tokunaga | F16J 15/34 |
| 2015/0123350 A1 | 5/2015 | Itadani | 277/400 |
| 2015/0184752 A1 | 7/2015 | Itadani | F16J 15/3412 |
| 2015/0226334 A1 | 8/2015 | Itadani | F16J 15/342 |
| 2015/0240950 A1 | 8/2015 | Takahashi | F16J 15/363 |
| 2015/0260292 A1 | 9/2015 | Inoue et al. | F16J 15/342 |
| 2015/0377297 A1 | 12/2015 | Tokunaga et al. | F16C 33/748 |
| 2015/0377360 A1 | 12/2015 | Itadani | F16J 15/3412 |
| 2016/0003361 A1 | 1/2016 | Takahashi | F16J 15/3408 |
| 2016/0033045 A1 | 2/2016 | Itadani et al. | F16J 15/3412 |
| 2016/0097457 A1 | 4/2016 | Sun et al. | F16J 15/34 |
| 2016/0252182 A1 | 9/2016 | Itadani et al. | F16J 15/342 |
| 2017/0009889 A1 | 1/2017 | Seki | F16J 15/3272 |
| 2017/0114902 A1 | 4/2017 | Itadani | F16J 15/3412 |
| 2017/0130844 A1 | 5/2017 | Itadani | F16J 15/3412 |
| 2017/0167615 A1 | 6/2017 | Itadani | F16J 15/3412 |
| 2017/0198814 A1 | 7/2017 | Colombo et al. | F16J 15/3412 |
| 2017/0234431 A1 | 8/2017 | Katori et al. | F16J 15/3412 |
| 2017/0241549 A1 | 8/2017 | Itadani | F16J 15/40 |
| 2018/0051809 A1 | 2/2018 | Yoshida | F16H 15/3412 |
| 2018/0058584 A1 | 3/2018 | Miyazaki | F16J 15/164 |
| 2018/0073394 A1 | 3/2018 | Tokunaga et al. | F01D 25/183 |
| 2018/0128377 A1 | 5/2018 | Tokunaga et al. | F16J 15/342 |
| 2018/0128378 A1 | 5/2018 | Tokunaga et al. | F16J 15/342 |
| 2018/0135699 A1 | 5/2018 | Takunaga | F16J 15/348 |
| 2018/0195618 A1 | 7/2018 | Itadani | F16J 15/342 |
| 2019/0178386 A1 | 6/2019 | Arai | F16J 15/3496 |
| 2019/0301522 A1 | 10/2019 | Negishi et al. | F16C 17/026 |
| 2019/0376558 A1 | 12/2019 | Kimura | F16C 33/743 |
| 2020/0182299 A1 | 6/2020 | Kimura | F16C 17/026 |
| 2021/0054935 A1 | 2/2021 | Kimura | F16J 15/3412 |
| 2021/0080006 A1 | 3/2021 | Sasaki | F16J 15/34 |
| 2021/0116029 A1 | 4/2021 | Kimura | F16J 15/324 |
| 2021/0116030 A1 | 4/2021 | Kimura | |
| 2021/0116032 A1 | 4/2021 | Kimura | F16J 15/188 |
| 2021/0164571 A1 | 6/2021 | Kimura | F16J 15/3412 |
| 2022/0010835 A1 * | 1/2022 | Inoue | F16C 17/045 |
| 2022/0099191 A1 | 3/2022 | Suzuki | F16C 33/103 |
| 2022/0145992 A1 | 5/2022 | Miyazaki | F16C 33/107 |
| 2022/0275828 A1 | 9/2022 | Inoue | F16J 15/3424 |
| 2023/0258184 A1 | 8/2023 | Suzuki | F04C 29/00 |

FOREIGN PATENT DOCUMENTS

| | | | |
|---|---|---|---|
| CN | 1401924 | 3/2003 | F16J 15/16 |
| CN | 101749431 | 6/2010 | F16J 15/34 |
| CN | 101776152 | 7/2010 | F16J 15/48 |
| CN | 201582390 | 9/2010 | F16J 15/16 |
| CN | 103267132 | 8/2013 | F16J 15/54 |
| CN | 103732958 | 4/2014 | F16J 15/34 |
| CN | 103791097 | 5/2014 | F16J 15/34 |
| CN | 104019237 | 9/2014 | F16J 15/16 |
| CN | 104165229 | 11/2014 | F16J 15/40 |
| CN | 105683632 | 6/2016 | F04D 29/10 |
| CN | 106439037 | 2/2017 | F16J 15/34 |
| CN | 206017723 | 3/2017 | F16J 15/16 |
| CN | 107166036 | 9/2017 | F16J 15/16 |

(56) References Cited

FOREIGN PATENT DOCUMENTS

| | | | |
|---|---|---|---|
| CN | 107532724 | 1/2018 | ............... F16J 15/34 |
| CN | 107676484 | 2/2018 | ........... F16J 15/3232 |
| CN | 108506494 | 9/2018 | ............... F16J 15/34 |
| DE | 36 19 489 | 12/1987 | ............... F16J 15/34 |
| DE | 4407453 | 9/1995 | ............... F16C 17/08 |
| EP | 0637706 | 8/1993 | ............... F16J 15/34 |
| EP | 0896163 | 2/1999 | ............... F16C 33/10 |
| EP | 2520835 | 11/2012 | ............... F16J 15/34 |
| EP | 2626604 | 8/2013 | ............... F16J 15/34 |
| EP | 2977655 | 1/2016 | ............... F16J 15/34 |
| EP | 3091258 | 11/2016 | ............... F16J 15/34 |
| EP | 3299686 | 3/2018 | ............... F16J 15/34 |
| EP | 3514414 | 7/2019 | ............... F16J 15/34 |
| EP | 3922872 | 12/2021 | ............... F16J 15/34 |
| EP | 3926187 | 12/2021 | ............... F16C 17/04 |
| EP | 3926188 | 12/2021 | ............... F16C 17/04 |
| EP | 3943765 | 1/2022 | ............... F16C 17/04 |
| GB | 1509482 | 5/1978 | ............... F16C 33/10 |
| JP | 36-6305 | 5/1961 | |
| JP | S49-33614 | 9/1974 | ............... F16J 15/34 |
| JP | S54-77305 | 6/1979 | ............... B06B 9/10 |
| JP | S55-177549 | 12/1980 | ............... F16J 15/16 |
| JP | S57-146955 | 9/1982 | ............... F16J 15/34 |
| JP | 58-109771 | 6/1983 | ............... F16J 15/34 |
| JP | 58-137667 | 8/1983 | ............... F16J 15/40 |
| JP | S59-58252 | 4/1984 | ............... F16J 15/34 |
| JP | S60-107461 | 7/1985 | ............... B63H 23/36 |
| JP | S6182177 | 5/1986 | ............... F16J 15/34 |
| JP | S62-37572 | 2/1987 | ............... F16J 51/34 |
| JP | S63-033027 | 3/1988 | ............... F16C 33/46 |
| JP | S63-190975 | 8/1988 | ............... F16J 15/34 |
| JP | H01133572 | 9/1989 | ............... F16J 15/34 |
| JP | 2-236067 | 9/1990 | ............... F16J 15/34 |
| JP | H02236067 A * | 9/1990 | |
| JP | 3-14371 | 2/1991 | ............... F16J 15/34 |
| JP | 3-35372 | 4/1991 | ............... F16J 15/34 |
| JP | 3-41267 | 4/1991 | ............... F16J 15/34 |
| JP | 3-41268 | 4/1991 | ............... F16J 15/34 |
| JP | H04-73 | 1/1992 | ............... F16J 15/34 |
| JP | H04-145267 | 5/1992 | ............... F16J 15/34 |
| JP | H04-96671 | 8/1992 | ............... F16J 15/34 |
| JP | H05-90048 | 12/1993 | ............... F16J 15/34 |
| JP | H05-322050 | 12/1993 | ............... F16J 15/34 |
| JP | H07-55016 | 3/1995 | ............... F16J 15/34 |
| JP | H08-89489 | 4/1996 | ............... A61B 5/05 |
| JP | H09-503276 | 3/1997 | ............... F16J 15/34 |
| JP | H09-329247 | 12/1997 | ............... F16J 15/34 |
| JP | H10-38093 | 2/1998 | ............... F16J 15/34 |
| JP | H10-281299 | 10/1998 | ............... F16J 15/34 |
| JP | 2000-179543 | 6/2000 | ............... F16C 17/10 |
| JP | 2001-295833 | 10/2001 | ............... F16C 17/04 |
| JP | 2001-317638 | 11/2001 | ............... F16J 15/34 |
| JP | 2003-161322 | 6/2003 | ............... F16C 33/10 |
| JP | 2003-343741 | 12/2003 | ............... F16J 15/34 |
| JP | 2004-003578 | 1/2004 | ............... F16J 15/34 |
| JP | 2005-188651 | 7/2005 | ............... F16J 15/34 |
| JP | 2005-58051 | 12/2005 | ............... F16C 33/74 |
| JP | 2006-9828 | 1/2006 | ............... F16C 17/02 |
| JP | 2006-022834 | 1/2006 | ............... F16J 15/34 |
| JP | 2006-77899 | 3/2006 | ............... F16J 15/34 |
| JP | 2008-144864 | 6/2008 | ............... F16C 33/10 |
| JP | 2009-250378 | 10/2009 | ............... F16J 15/34 |
| JP | 2010-133496 | 6/2010 | ............... F16J 15/34 |
| JP | 2010-216587 | 9/2010 | ............... F16J 15/34 |
| JP | 2011-185292 | 9/2011 | ............... F16J 15/34 |
| JP | 2011196429 | 10/2011 | ............... F16J 15/34 |
| JP | 2012-2295 | 1/2012 | ............... F16J 15/34 |
| JP | 5271858 | 5/2013 | ............... F16J 15/34 |
| JP | 2016-80090 | 5/2016 | ............... F16J 15/34 |
| JP | 2017-141961 | 8/2017 | ............... F16J 15/34 |
| JP | 6444492 | 12/2018 | ............... F16J 15/34 |
| JP | 2019-15401 | 1/2019 | ............... F16J 15/34 |
| JP | 201913446 | 1/2019 | ............... A47J 27/00 |
| WO | WO 95/06832 | 3/1995 | ............... F16J 15/34 |
| WO | WO 2012/046749 | 4/2012 | ............... F16J 15/34 |
| WO | WO 2014/024742 | 2/2014 | ............... F16J 15/34 |
| WO | WO 2014/050920 | 4/2014 | ............... F16J 15/34 |
| WO | WO 2014/103630 | 7/2014 | ............... F16J 15/34 |
| WO | WO 2014/112455 | 7/2014 | ............... F16J 15/34 |
| WO | WO2014103631 | 7/2014 | ............... F16J 15/34 |
| WO | WO 2014/148316 | 9/2014 | ............... F16J 15/34 |
| WO | WO 2014/174725 | 10/2014 | ............... F16J 15/34 |
| WO | WO 2016/009408 | 1/2016 | ............... F16J 15/34 |
| WO | WO 2016/035860 | 3/2016 | ............... F16J 15/34 |
| WO | WO 2016/167262 | 10/2016 | ............... F16J 15/34 |
| WO | WO 2016/186019 | 11/2016 | ............... F16J 15/34 |
| WO | WO2016203878 | 12/2016 | ............... F16J 15/34 |
| WO | WO 2017/002774 | 1/2017 | ............... F16J 15/34 |
| WO | WO 2018/034197 | 2/2018 | ............... F16J 15/34 |
| WO | WO 2018/105505 | 6/2018 | ............... F16J 15/34 |
| WO | WO2018139231 | 8/2018 | ............... F16J 15/34 |
| WO | WO2018139232 | 8/2018 | ............... F16C 33/10 |

OTHER PUBLICATIONS

Chinese Office Action issued in application No. 201980043720.7 (with translation), dated Jun. 6, 2022 (12 pgs).
Chinese Office Action issued in application No. 202080014381.2 (with translation), dated Aug. 11, 2022 (15 pgs).
Chinese Office Action issued in application No. 202080012994.2 (with translation), dated Aug. 29, 2022 (14 pgs).
European Official Action issued in related European Patent Application Serial No. 19869466.3, dated May 19, 2022, 9 pages.
European Official Action issued in related European Patent Application Serial No. 19876680.0, dated Jun. 3, 2022, 8 pages.
European Official Action issued in related European Patent Application Serial No. 19888532.9, dated Jul. 8, 2022, 7 pages.
European Official Action issued in related European Patent Application Serial No. 19899646.4, dated Aug. 12, 2022, 9 pages.
Korean Office Action issued in application No. 10-2020-7037305 (with translation), dated Jun. 24, 2022 (17 pgs).
Korean Office Action issued in application No. 10-2021-7002193 (with translation), dated Jul. 18, 2022 (13 pgs).
Office Action issued in U.S. Appl. No. 17/257,260, dated Jul. 6, 2022 (12 pgs).
Chinese Office Action issued in application No. 201980065303.2 (with translation), dated Oct. 10, 2022 (13 pgs).
European Official Action issued in related European Patent Application Serial No. 19914452.8, dated Oct. 5, 2022, 10 pages.
European Official Action issued in related European Patent Application Serial No. 20756664.7, dated Oct. 14, 2022, 8 pages.
European Official Action issued in related European Patent Application Serial No. 20759684.2, dated Oct. 17, 2022, 7 pages.
Korean Office Action issued in application No. 10-2021-7019130 (with translation), dated Oct. 22, 2022 (13 pgs).
Korean Office Action issued in application No. 10-2021-7007194 (with translation), dated Nov. 7, 2022 (14 pgs).
Korean Office Action issued in application No. 10-2021-7009776 (with translation), dated Dec. 12, 2022 (19 pgs).
Notice of Allowance issued in U.S. Appl. No. 17/257,260, dated Nov. 23, 2022, 9 pages.
U.S. Appl. No. 17/429,986, filed Aug. 10, 2021, Suzuki et al.
U.S. Appl. No. 17/603,561, filed Oct. 13, 2021, Imura et al.
Definition of groove by Merriam Webster.
Chinese Office Action issued in application No. 201380070532.6 (with translation), dated Jan. 28, 2016 (13 pgs).
Chinese Office Action issued in application No. 201380070532.6 (with translation), dated Sep. 20, 2016 (12 pgs).
Second Office Action issued by the State Intellectual Property Office of China, mailed Aug. 29, 2016, for Chinese counterpart application No. 201480002574.0, 8 pages.
First Notification of Reason for Refusal issued by the State Intellectual Property Office of China, dated Dec. 24, 2015, with a search report for Chinese counterpart application No. 201480002574.0, 11 pages.
Office Action issued in U.S. Appl. No. 14/431,733, dated Apr. 29, 2016 (22 pgs).

(56) References Cited

OTHER PUBLICATIONS

Office Action issued in U.S. Appl. No. 14/431,733, dated Aug. 18, 2017 (13 pgs).
Office Action issued in U.S. Appl. No. 14/431,733, dated Mar. 31, 2017 (14 pgs).
Office Action issued in U.S. Appl. No. 14/431,733, dated Oct. 6, 2016 (12 pgs).
Office Action issued in U.S. Appl. No. 15/419,989, dated Jan. 26, 2018 (20 pgs).
Office Action issued in U.S. Appl. No. 15/419,970, dated May 11, 2018 (17 pgs).
Office Action issued in U.S. Appl. No. 15/419,970, dated Jan. 23, 2018 (21 pgs).
Office Action issued in U.S. Appl. No. 15/842,862, dated Jun. 5, 2019 (37 pgs).
Office Action issued in U.S. Appl. No. 15/842,855, dated Mar. 12, 2020 (11 pgs).
Office Action issued in U.S. Appl. No. 15/842,855, dated Jun. 29, 2020, 16 pages.
Office Action issued in U.S. Appl. No. 15/842,858, dated Mar. 31, 2020 (10 pgs).
Office Action issued in U.S. Appl. No. 15/842,859, dated Apr. 8, 2020 (12 pgs).
Notice of Allowance issued in U.S. Appl. No. 15/419,970, dated Aug. 9, 2018 (16 pgs).
Notice of Allowance issued in U.S. Appl. No. 14/431,733, dated Feb. 23, 2018 (22 pgs).
Notice of Allowance issued in U.S. Appl. No. 15/419,989, dated Jul. 23, 2018 (11 pgs).
Notice of Allowance issued in U.S. Appl. No. 15/842,862, dated Sep. 30, 2019, 15 pages.
Japanese Office Action (w/translation) issued in application 2018-159877, dated Jun. 13, 2019 (7 pgs).
International Search Report issued in application No. PCT/JP2013/084029, dated Mar. 25, 2014 (4 pgs).
International Preliminary Report on Patentability issued in application No. PCT/JP2013/084029, dated Nov. 5, 2015 (8 pgs).
International Search Report and Written Opinion issued in PCT/JP2014/050402, dated Feb. 10, 2014, with English translation, 12 pages.
International Preliminary Report on Patentability issued in PCT/JP2014/050402, dated Jul. 21, 2015, 4 pages.
International Search Report and Written Opinion issued in PCT/JP2019/045728, dated Dec. 17, 2019, with English translation, 13 pages.
International Preliminary Report on Patentability issued in PCT/JP2019/045728, dated May 25, 2021, 7 pages.
International Search Report and Written Opinion issued in PCT/JP2019/047890, dated Feb. 10, 2020, with English translation, 13 pages.
International Preliminary Report on Patentability issued in PCT/JP2019/047890, dated Aug. 10, 2021, 7 pages International Search Report and Written Opinion issued in PCT/JP2019/049870, dated Mar. 10, 2020, with English translation, 13 pages.
Internationa; Search Report and Written Opininion issued in PCT/JP2019/049870, dated Mar. 10, 2020, with English translation, 13 pages.
International Preliminary Report on Patentability issued in PCT/JP2019/049870, dated Jun. 16, 2021, 7 pages.
International Search Report and Written Opinion issued in PCT/JP2020/005260, dated Apr. 7, 2020, with English translation, 16 pages.
International Preliminary Report on Patentability issued in PCT/JP2020/005260, dated Aug. 10, 2021, 9 pages.
International Search Report and Written Opinion issued in PCT/JP2020/006421, dated Apr. 21, 2020, with English translation, 13 pages.
International Preliminary Report on Patentability issued in PCT/JP2020/006421, dated Aug. 10, 2021, 6 pages.
International Search Report and Written Opinion issued in PCT/JP2020/017170, dated Jun. 2, 2020, with English translation, 13 pages.
International Preliminary Report on Patentability issued in PCT/JP2020/027005, dated Feb. 1, 2022, 4 pages.
International Search Report and Written Opinion issued in PCT/JP2020/027005, dated Sep. 1, 2020, with English translation, 11 pages.
International Preliminary Report on Patentability issued in PCT/JP2019/032723, dated Mar. 2, 2021, 6 pages.
International Search Report and Written Opinion issued in PCT/JP2019/032723, dated Nov. 5, 2019, with English translation, 17 pages.
International Preliminary Report on Patentability issued in PCT/JP2019/029771, dated Feb. 2, 2021, 7 pages.
International Search Report and Written Opinion issued in PCT/JP2019/029771, dated Sep. 17, 2019, with English translation, 20 pages.
International Preliminary Report on Patentability issued in PCT/JP2019/040209, dated Apr. 27, 2021, 6 pages.
International Search Report and Written Opinion issued in PCT/JP2019/040209, dated Dec. 24, 2019, with English translation, 17 pages.
International Preliminary Report on Patentability issued in PCT/JP2019/038155, dated Mar. 23, 2021, 6 pages.
International Search Report and Written Opinion issued in PCT/JP2019/038155, dated Nov. 19, 2019, with English translation, 18 pages.
European Official Action issued in related European Patent Application Serial No. 19850900.2, dated Mar. 31, 2022, 11 pages.
European Official Action issued in related European Patent Application Serial No. 19843273.4, dated Mar. 24, 2022, 9 pages.
Chinese Office Action issued in application No. 201980076998.4 (with translation), dated Jan. 18, 2023, 12 pages.
Chinese Office Action issued in application No. 201980059152.X (with translation), dated Oct. 10, 2022, 14 pages.
Chinese Office Action issued in application No. 202080012994.2(with translation), dated Feb. 2, 2023, 13 pages.
Chinese Office Action issued in application No. 202080012994.2(with translation), dated Apr. 24, 2023, 12 pages.
Chinese Office Action issued in application No. 201980082245.4 (with translation), dated Feb. 16, 2023, 23 pages.
European Official Action issued in application No. 19869466.3, dated Mar. 16, 2023, 7 pages.
Korean Official Action issued in Korean Patent Application Serial No. 10-2021-7002193, dated Jan. 11, 2023, 11 pages.
Korean Official Action issued in Korean Patent Application Serial No. 10-2021-7022185, dated Apr. 6, 2023, 12 pages.
Official Action issued in related U.S. Appl. No. 17/413,466, dated Apr. 12, 2023, 11 pages.
Official Action issued in related U.S. Appl. No. 17/296,466, dated Apr. 12, 2023, 9 pages.
Official Action issued in related U.S. Appl. No. 17/428,909, dated Apr. 21, 2023, 8 pages.
European Official Action issued in application no. 20759684.2, dated September 25, 2023, 6 pages.
Korean Official Action issued in Korean Patent Application Serial No. 10-2021-7002193, dated July 17, 2023, 6 pages with translation.
Korean Official Action issued in Korean Patent Application Serial No. 10-2021-7000686, dated Aug. 22, 2023, 6 pages with translation.
Official Action issued in related U.S. Appl. No. 17/277,282, dated Oct. 6, 2023, 8 pages.
Chinese Office Action issued in application No. 201980082245.4 (with translation), dated Aug. 3, 2023, 25 pages.
Chinese Office Action issued in application No. 201980059152.x (with translation), dated May 8, 2023 (11 pgs).
European Official Action issued in application No. 22212136.0, dated Mar. 15, 2023, 8 pages.
European Official Action issued in application No. 19850900.2, dated Mar. 28, 2023, 4 pages.

(56) References Cited

OTHER PUBLICATIONS

European Official Action issued in application No. 23155551.7, dated Feb. 28, 2023, 7 pages.
European Official Action issued in application No. 19888532.9, dated Mar. 7, 2023, 3 pages.
European Official Action issued in application no. 23158438.4, dated May 15, 2023, 11 pages
European Official Action issued in application No. 19876680.0, dated Aug. 24, 2023, 8 pages
European Search Report issued in application no. 20847261.3, dated Jul. 17, 2023, 8 pages.
Japanese Decision of Refusal issued in application No. 2021-502065, dated May 23, 2023, 8 pages.
Korean Official Action issued in Korean Patent Application Serial No. 10-2021-7028879, dated Jun. 28, 2023, 10 pages.
Korean Official Action issued in Korean Patent Application Serial No. 10-2021-7016898, dated Feb. 16, 2023, 13 pages.
Korean Official Action issued in Korean Patent Application Serial No. 10-2022-7002564, dated Jun. 27, 2023, 11 pages with translation.
Korean Official Action issued in Korean Patent Application Serial No. 10-2021-7028347, dated Jun. 22, 2023, 11 pages with translation.
Korean Official Action issued in Korean Patent Application Serial No. 10-2021-7009776, dated Jun. 28, 2023, 8 pages with translation.
Official Action issued in related U.S. Appl. No. 17/428,909, dated Jul. 25, 2023, 8 pages.
Official Action issued in related U.S. Appl. No. 17/628,158, dated May 15, 2023, 14 pages.
Official Action issued in related U.S. Appl. No. 17/420,660, dated Sep. 13, 2023, 10 pages.
Notice of Allowance issued in related U.S. Appl. No. 17/296,466, dated Jul. 24, 2023, 11 pages.
Notice of Allowance issued in related U.S. Appl. No. 17/259,336, dated Sep. 19, 2023, 8 pages.
U.S. Appl. No. 17/257,260, filed Dec. 30, 2020, Okada.
U.S. Appl. No. 17/259,336, filed Jan. 11, 2021, Imura.
U.S. Appl. No. 17/275,505, filed Mar. 11, 2021, Tokunaga et al..
U.S. Appl. No. 17/277,282, filed Mar. 17, 2021, Tokunaga.
U.S. Appl. No. 17/296,466, filed May 24, 2021, Inoue et al.
U.S. Appl. No. 17/413,466, filed Jun. 11, 2021, Imura et al.
U.S. Appl. No. 17/420,660, filed Jul. 2, 2021, Suzuki et al.
U.S. Appl. No. 17/429,896, filed Aug. 10, 2021, Suzuki et al.
U.S. Appl. No. 17/628,158, filed Jan. 18, 2022, Inoue et al.
Chinese Office Action issued in application no. 201980076998.4 (with translation), dated Sep. 29, 2023, 7 pages.
Official Action issued in related U.S. Appl. No. 17/429,896, dated Oct. 10, 2023, 14 pages.

\* cited by examiner

A — A CROSS-SECTIONAL VIEW

SLIDING COMPONENT

TECHNICAL FIELD

The present invention relates to relatively rotating sliding components, for example, sliding components used in a shaft sealing device axially sealing a rotation shaft of a rotary machine in an automobile, a general industrial machine, or other sealing fields or sliding components used in a bearing of a machine in an automobile, a general industrial machine, or other bearing fields.

BACKGROUND ART

Conventionally, as a shaft sealing device that axially seals a rotation shaft of a rotary machine such as a pump or a turbine and prevents a sealed fluid from leaking, one including two components rotating relative to each other so that flat end surfaces slide on each other, for example, a mechanical seal is known. The mechanical seal includes a stationary seal ring which is a sliding component fixed to a housing and a rotating seal ring which is a sliding component fixed to a rotation shaft and rotating together with the rotation shaft and axially seals a gap between the housing and the rotation shaft by relatively rotating these sliding surfaces. In such a mechanical seal, it has been recently desired to reduce energy lost due to sliding for environmental measures and sliding components such as Patent Citation 1 have been developed to reduce the energy lost due to sliding by reducing friction caused by sliding.

For example, the sliding component shown in Patent Citation 1 is provided with a dynamic pressure generation groove of which one end forms an inlet and communicates with an outer radial side corresponding to a high-pressure sealed liquid side in a sliding surface of the sliding component and the other end in the sliding surface forms a closed end. Accordingly, when the sliding components rotate relative to each other, since a sealed fluid flowing from the inlet into the dynamic pressure generation groove flows out from the closed end of the dynamic pressure generation groove to a gap between the sliding surfaces, the sliding surfaces are separated from each other by a dynamic pressure. At the same time, since the dynamic pressure generation groove holds the sealed liquid, lubricity is improved. As a result, low friction is realized.

CITATION LIST

Patent Literature

Patent Citation 1: JP 6444492 B2 (Page 5, FIG. 2)

SUMMARY OF INVENTION

Technical Problem

In the sliding component shown in Patent Citation 1, when the sliding components rotate relative to each other, the sealed fluid in the dynamic pressure generation groove flows toward one (hereinafter, referred to as a "dynamic pressure generation wall") of both side walls constituting the dynamic pressure generation groove due to a shearing force generated between the sliding surfaces with the rotation so that a high pressure (dynamic pressure) is generated in the dynamic pressure generation wall. Then, this pressure gradually becomes higher toward the closed end and a low pressure is likely to be generated particularly on the side of the side wall circumferentially opposite to the dynamic pressure generation wall in the inlet of the dynamic pressure generation groove. In this way, when the pressure in the vicinity of the inlet of the dynamic pressure generation groove decreases so that a negative pressure is generated, the sealed fluid is not easily introduced from the inlet of the dynamic pressure generation groove. Accordingly, since a desired pressure is not generated from the dynamic pressure generation wall and the closed end of the dynamic pressure generation groove and a sufficient pressure is not generated, lubricity is deteriorated. Further, when a negative pressure is generated and cavitation is generated in the vicinity of the inlet of the dynamic pressure generation groove, it is remarkably difficult to introduce the sealed fluid from the inlet of the dynamic pressure generation groove.

The present invention has been made in view of such problems and an object of the present invention is to provide a sliding component having excellent lubricity.

Solution to Problem

In order to solve the foregoing problems, a sliding component according to the present invention is a sliding component formed in an annular shape and disposed at a relatively rotating position of a rotary machine, the sliding component including: a dynamic pressure generation groove provided in a sliding surface of the sliding component, the dynamic pressure generation groove having a first end forming a closed end and a second end forming an inlet communicating with any one side of a sealed fluid side and a leakage side in a radial direction; and a deep groove provided in the sliding surface and deeper than the dynamic pressure generation groove, an inlet of the deep groove communicating with an inlet of the dynamic pressure generation groove on a side of a side wall of the dynamic pressure generation groove, the side wall being circumferentially opposite to a dynamic pressure generation wall constituting another side wall of the dynamic pressure generation groove. According to the aforesaid feature of the present invention, since a position where the lowest pressure is likely to be generated in the dynamic pressure generation groove during the relative rotation of the sliding components is on the side of the side wall circumferentially opposite to the dynamic pressure generation wall constituting one of both side walls constituting the dynamic pressure generation groove in the inlet of the dynamic pressure generation groove and the inlet of the deep groove communicates with this position, a fluid is sufficiently supplied from this deep groove to the dynamic pressure generation groove and hence a negative pressure is not easily generated at the corresponding position. As a result, the fluid is continuously supplied to the dynamic pressure generation groove and a desired pressure can be generated from the closed end of the dynamic pressure generation groove. Accordingly, lubricity is excellent.

It may be preferable that the deep groove communicates with the dynamic pressure generation groove along the side wall circumferentially opposite to the dynamic pressure generation wall of the dynamic pressure generation groove in the radial direction and is shorter than the side wall in the radial direction. According to this preferable configuration, a wide inflow area from the deep groove to the dynamic pressure generation groove can be ensured while the deep groove does not easily influence the function of generating the dynamic pressure of the dynamic pressure generation groove.

It may be preferable that the deep groove includes a pair of wall portions extending in parallel radially and facing each other. According to this preferable configuration, since the inner space of the deep groove is sandwiched by the facing wall portions in the circumferential direction of the sliding surface, the sealed fluid is easily held in the deep groove and the sealed fluid can be stably supplied to the dynamic pressure generation groove.

It may be preferable that the deep groove is formed such that a circumferential width of the deep groove is shorter than a radial length of the deep groove. According to this preferable configuration, since the deep groove is short in the circumferential direction, a dynamic pressure is not easily generated by the relative rotation of the sliding components in the deep groove and the sealed fluid is easily held in the deep groove.

It may be preferable that a width of the inlet of the deep groove is half or less of a width of the inlet of the dynamic pressure generation groove. According to this preferable configuration, it is possible to reliably introduce the sealed fluid into the dynamic pressure generation groove and suppress a negative pressure from being generated in the vicinity of the inlet of the dynamic pressure generation groove at the same time during the relative rotation of the sliding components.

It may be preferable that a depth of the deep groove is ten times or more a depth of the dynamic pressure generation groove. According to this preferable configuration, the volume of the deep groove is large and a sufficient amount of the sealed fluid is supplied from the deep groove to the dynamic pressure generation groove during the relative rotation of the sliding components.

In addition, the expression of extending in the radial direction according to the present invention may also have a circumferential component as long as there is at least a radial component.

DESCRIPTION OF EMBODIMENTS

Figure 1:
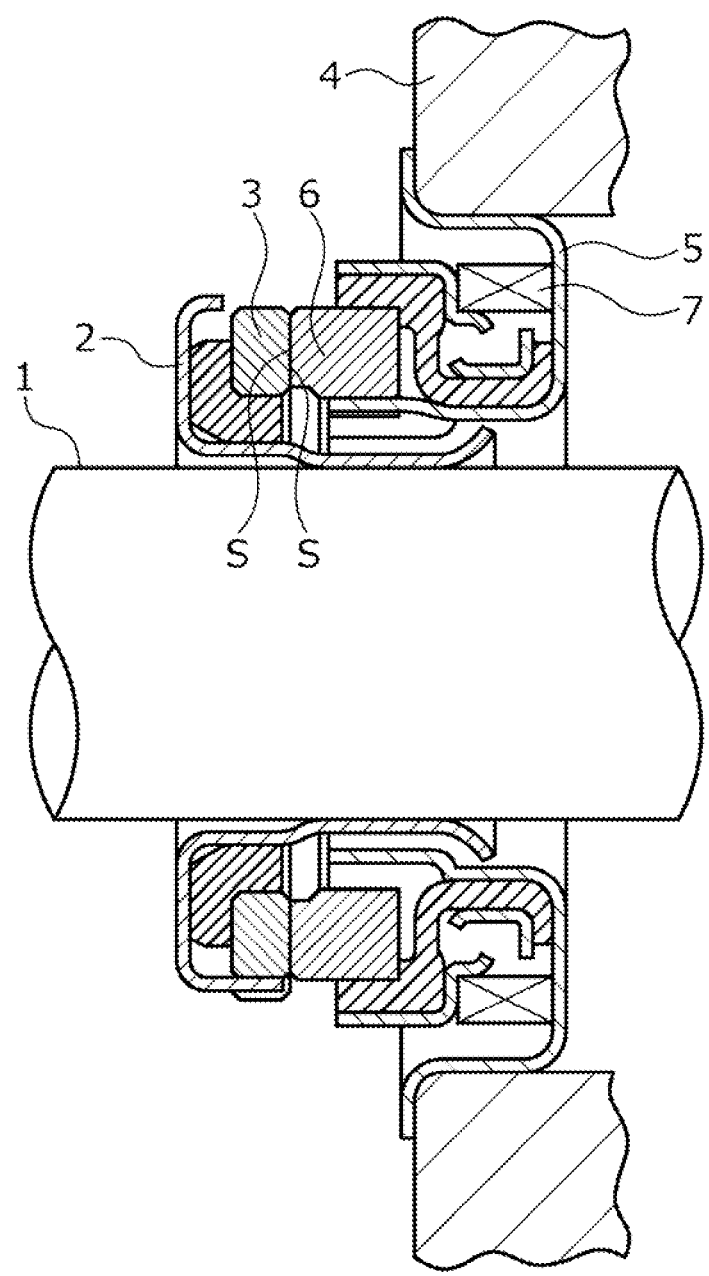
FIG. 1 is a cross-sectional view illustrating a structure of a rotary machine that uses a mechanical seal including sliding components according to a first embodiment of the present invention.

Modes for implementing a sliding component according to the present invention will be described below based on embodiments.

First Embodiment

Sliding components according to a first embodiment of the present invention will be described with reference to FIGS. 1 to 5.

The sliding components of this embodiment are, for example, a rotating seal ring 3 and a stationary seal ring 6 constituting a mechanical seal which is a shaft sealing device axially sealing a rotation shaft of a rotary machine in an automobile, a general industrial machine, or other sealing fields. Further, for convenience of description, dots may be added to grooves and the like formed on a sliding surface in the drawings.

As illustrated in FIG. 1, a mechanical seal of this embodiment is of an inside type that seals a sealed fluid that tends to leak from a sealed fluid side which is an outer circumferential side of a sliding surface toward a leakage side which is an inner circumferential side and an annular rotating seal ring 3 which is provided on the side of a rotation shaft 1 through a sleeve 2 to be rotatable together with the rotation shaft 1 and an annular stationary seal ring 6 which is provided in a seal cover 5 fixed to a housing 4 of a rotary machine not to be rotatable and to be axially movable are configured such that sliding surfaces S slide on each other in a close contact state by a biasing member 7 axially biasing the stationary seal ring 6. That is, this mechanical seal is for preventing a sealed fluid F which is a high-pressure fluid on the outer circumferential side of the sliding surface S from leaking to the inner circumferential side which is the leakage side where an atmosphere A which is a low-pressure fluid exists in the sliding surface S between the rotating seal ring 3 and the stationary seal ring 6 (see FIG. 2). In this embodiment, the sealed fluid F is a liquid.

The rotating seal ring 3 and the stationary seal ring 6 are typically formed of SiC (as an example of hard material) or a combination of SiC (as the example of hard material) and carbon (as an example of soft material), but any sliding material is applicable as long as the sliding material is used as the sliding material for the mechanical seal. Examples of SiC include a sintered body using boron, aluminum, carbon, and the like as a sintering aid and materials composed of two or more types of phases having different components and compositions, for example, SiC obtained by dispersing graphite particles, reaction sintered SiC composed of SiC and Si, SiC—TiC, SiC—TiN, and the like and examples of carbon include carbon obtained by mixing carbon materials and graphite materials, resin molded carbon, sintered carbon, and the like. In addition to the above sliding materials, metal materials, resin materials, surface modification materials (e.g., coating materials), composite materials, and the like can also be applied.

Figure 2:
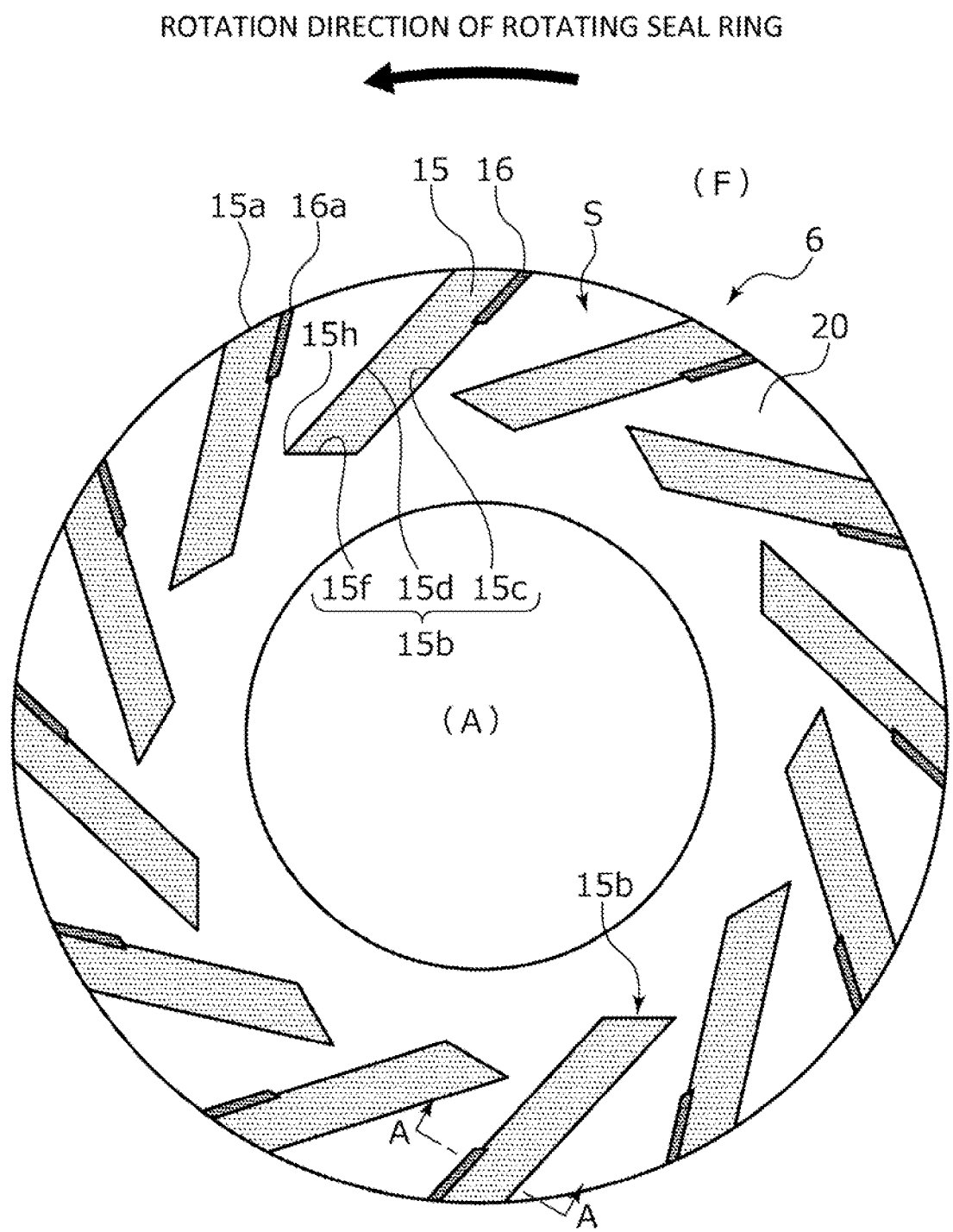
FIG. 2 is a view in which a stationary seal ring is viewed from a sliding surface side in the first embodiment.

As illustrated in FIG. 2, the sliding surface S of the stationary seal ring 6 is provided with a plurality of dynamic pressure generation grooves 15 which are arranged in the circumferential direction and are separated from each other in the circumferential direction. The dynamic pressure generation grooves 15 are formed side by side with the same separation width in the circumferential direction. The dynamic pressure generation groove 15 can be formed by subjecting the mirror-processed sliding surface S to fine processing such as laser processing or sandblasting. A portion not provided with the dynamic pressure generation groove 15 and a deep groove 16 to be described later in the sliding surface S is a land portion 20 forming a flat surface.

Figure 3:
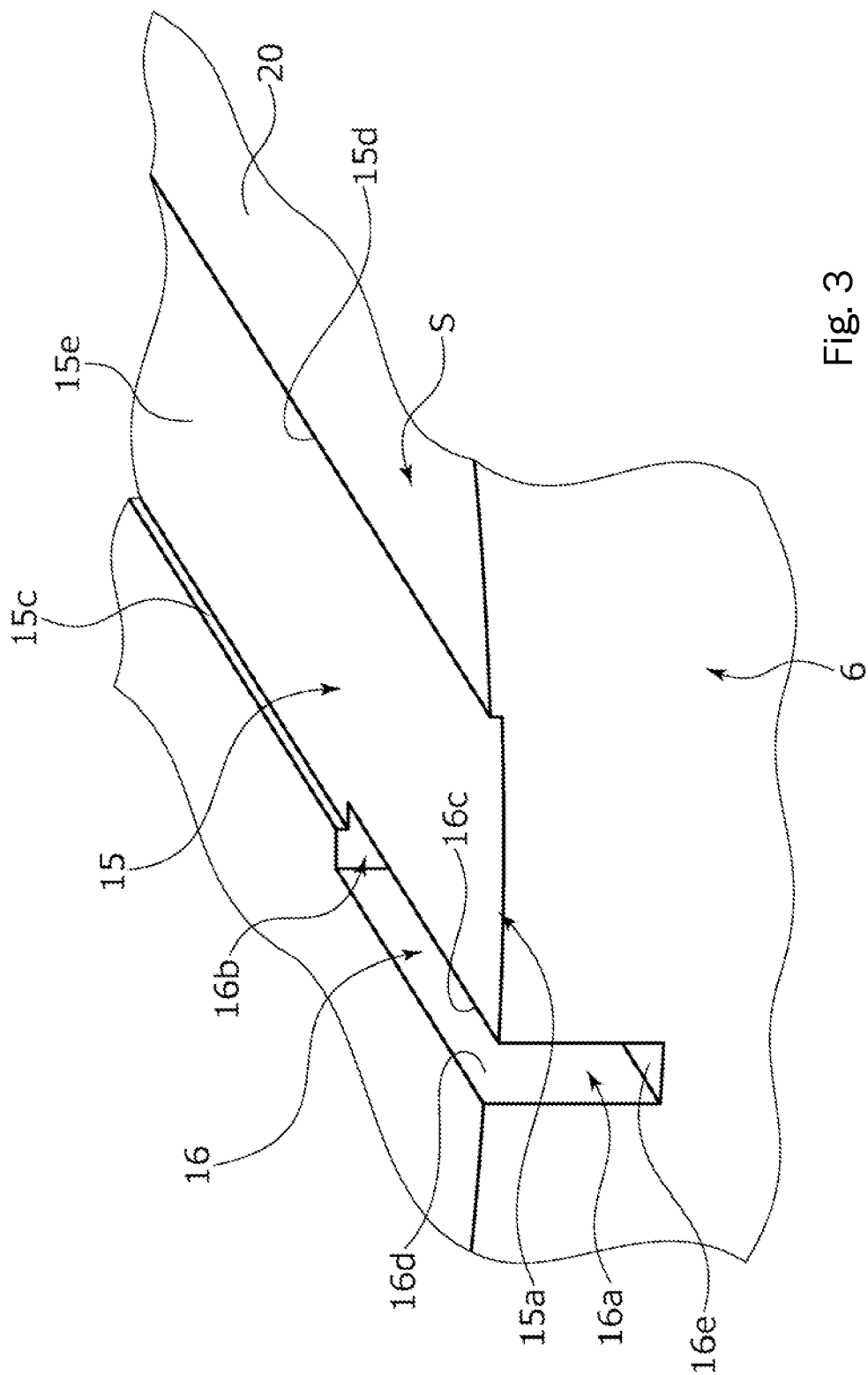
FIG. 3 is a perspective view in which a dynamic pressure generation groove and a deep groove are viewed from an inlet side in the first embodiment.
Figure 4:
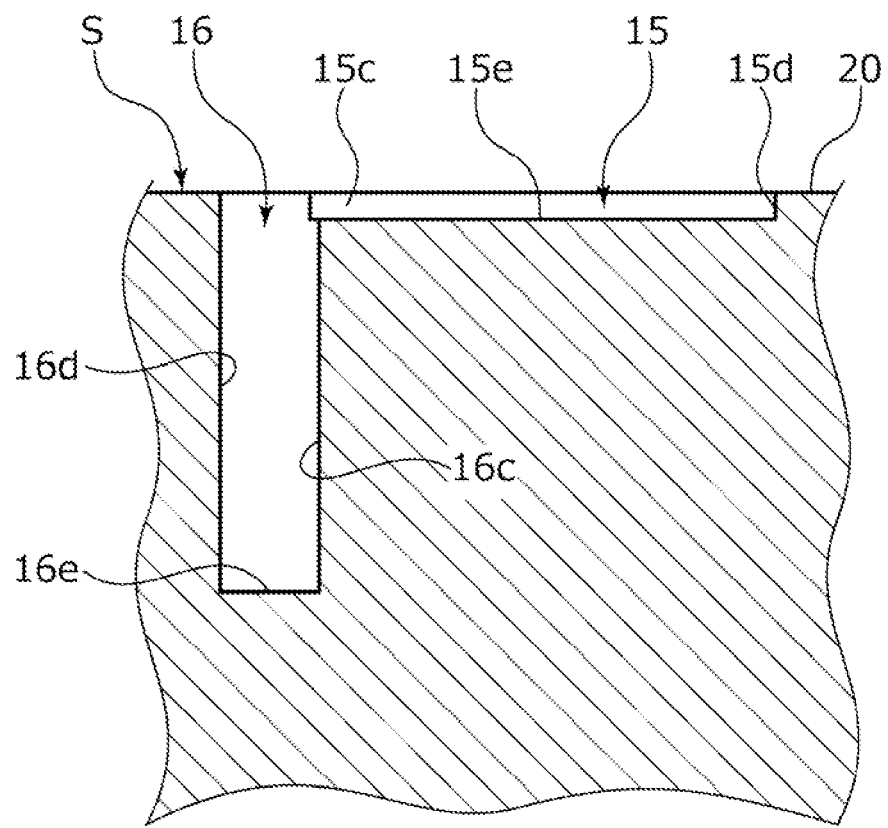
FIG. 4 is a cross-sectional view taken along a line A-A of FIG. 2 illustrating a relationship between the dynamic pressure generation groove and the deep groove in the first embodiment.

As illustrated in FIGS. 2 to 4, the dynamic pressure generation groove 15 is formed such that one end forms an inlet 15a communicating with the side of the sealed fluid F and the other end forms a closed end 15b and is obliquely formed in the rotation direction to generate a dynamic pressure on the side of the closed end 15b during the relative rotation of the rotating seal ring 3 and the stationary seal ring 6. Further, the dynamic pressure generation grooves 15 are formed to have the same depth in the radial direction. In the dynamic pressure generation groove 15, the sealed fluid F flows in the dynamic pressure generation groove 15 toward one side wall 15d in the right and left side walls 15c and 15d of the dynamic pressure generation groove 15 due to a shearing force generated between the sliding surfaces S with the rotation during the relative rotation of the rotating seal ring 3 and the stationary seal ring 6 so that a high pressure, that is, a dynamic pressure is generated in the side wall 15d which is the dynamic pressure generation wall.

The deep groove 16 is located on the side opposite to the closed end 15b in the circumferential direction with respect to the dynamic pressure generation groove 15 and communicates with the dynamic pressure generation groove 15 in the circumferential direction. Specifically, a side wall 16c on the side of the dynamic pressure generation groove 15 in the right and left side walls of the deep groove 16 is located on the side of the side wall 15c circumferentially opposite to the side wall 15d which is the dynamic pressure generation wall on the side opposite to the deep groove 16 in the right and left side walls 15c and 15d of the dynamic pressure generation groove 15. That is, as illustrated in FIG. 2, the deep groove 16 is formed to partially overlap the dynamic pressure generation groove 15 in the circumferential direction when viewed from a plane orthogonal to the sliding surface S.

Further, as illustrated in FIG. 3, the dynamic pressure generation groove 15 has a U-shaped cross-section in which both side walls 15c and 15d are orthogonal to a bottom surface 15e and the bottom surface 15e is parallel to the land portion 20. Similarly, the deep groove 16 also has a U-shaped cross-section in which both side walls 16c and 16d are orthogonal to a bottom surface 16e and the bottom surface 16e is parallel to the land portion 20. In addition, these bottom surfaces 15e and 16e may be inclined with respect to the land portion 20 and these cross-sectional shapes may be, for example, V shapes other than U shapes.

Further, an inlet 16a of the deep groove 16 communicating with the side of the sealed fluid F communicates with the inlet 15a of the dynamic pressure generation groove 15 in the circumferential direction.

Further, as illustrated in FIG. 2, the closed end 15b of the dynamic pressure generation groove 15 is partitioned by a wall 15f which faces the circumferential direction in a plan view and extends in a direction orthogonal to the sliding surface S and the side walls 15c and 15d which are orthogonal to the sliding surface S. At the closed end 15b, the side wall 15d and the wall 15f intersect each other and a tip portion 15h is formed at an acute angle.

Figure 5:
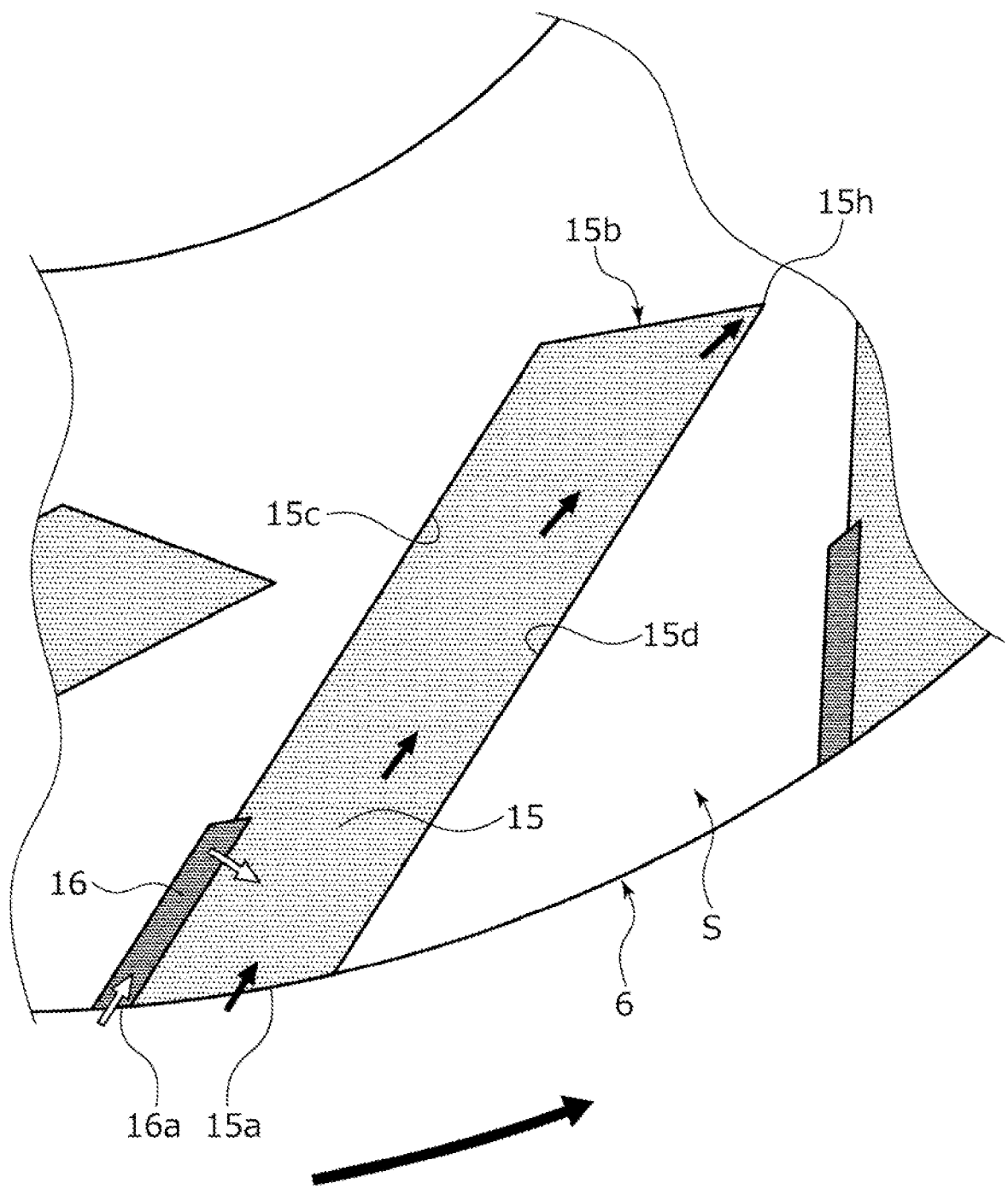
FIG. 5 is a conceptual diagram illustrating a movement of a fluid during a rotation of a rotary machine in the first embodiment.

Next, a function of the dynamic pressure generation groove 15 and the deep groove 16 during the relative rotation of the rotating seal ring 3 and the stationary seal ring 6 will be described with reference to FIG. 5. In addition, an arrow in FIGS. 2 and 5 indicates a relative rotation direction of the rotating seal ring 3 which is a mating sliding component.

As a premise, when the rotary machine is stopped, the sealed fluid F enters the inlet 15a and the inlet 16a of the deep groove 16 so that the dynamic pressure generation groove 15 and the deep groove 16 are filled with the sealed fluid F. As illustrated in FIG. 5, the sealed fluid F in the dynamic pressure generation groove 15 flows toward the side wall 15d and the closed end 15b due to a shearing force generated between the sliding surfaces S with the rotation during the relative rotation of the rotating seal ring 3 and the stationary seal ring 6 so that a dynamic pressure is generated in the side wall 15d and the closed end 15b.

At this time, in the dynamic pressure generation groove 15, a higher pressure is gradually generated as it goes closer to the tip portion 15h which is most advanced in the movement direction of the sealed fluid F moved with the shearing force generated between the sliding surfaces S and of which the tip faces the movement direction of the sealed fluid F at an acute angle and the sealed fluid F is drawn toward the closed end 15b of the dynamic pressure generation groove 15 (such that the movement direction is indicated by a black arrow). As a result, a low pressure tends to be generated on the side of the side wall 15c circumferentially opposite to the side wall 15d of the inlet 15a of the dynamic pressure generation groove 15.

Here, since the deep groove 16 which is formed to be deeper than the dynamic pressure generation groove 15 is disposed on the side of the side wall 15c in the circumferential direction of the inlet 15a of the dynamic pressure generation groove 15, the sealed fluid F which is ensured in this deep groove 16 is supplied in the vicinity of the inlet 15a of the dynamic pressure generation groove 15 (as indicated by a white arrow) and hence a negative pressure is not easily generated at that position.

For that reason, the sealed fluid F is continuously supplied to the dynamic pressure generation groove 15 so that a high pressure can be generated from the closed end 15b of the dynamic pressure generation groove 15 and the generation of cavitation caused by the insufficient supply amount of the sealed fluid F is suppressed. Accordingly, lubricity is excellent.

Further, since the sealed fluid F is statically supplied from the outside to the deep groove 16 opening to the side of the sealed fluid F through the inlet 16a, the sealed fluid F can be continuously supplied from the deep groove 16 to the vicinity of the inlet 15a of the dynamic pressure generation groove 15.

Further, the deep groove 16 communicates with the dynamic pressure generation groove 15 which is a shallow groove at a diagonal angle of the tip portion 15h of the closed end 15b of the dynamic pressure generation groove 15. For that reason, the inlet 16a of the deep groove 16 located at a diagonal angle of the tip portion 15h of the closed end 15b generating the highest pressure is a position where the lowest pressure is likely to be generated. As a result, the generation of a small pressure at the inlet 15a of the dynamic pressure generation groove 15 can be suppressed most efficiently and the generation of cavitation due to the insufficient supply amount of the sealed fluid F can be suppressed.

Further, since the deep groove 16 communicates along the dynamic pressure generation groove 15 in the radial direction, the sealed fluid F can be supplied in a wide range in the radial direction to the side circumferentially opposite to the closed end 15b in the inlet 15a of the dynamic pressure generation groove 15 and the generation of a negative pressure can be efficiently prevented. In addition, since the deep groove 16 is formed to be shorter than the dynamic pressure generation groove 15 in the radial direction, the original function of the dynamic pressure generation groove 15 is not easily influenced even when the deep groove 16 is formed while sufficiently ensuring a position of generating a dynamic pressure necessary for the lubricity in the dynamic pressure generation groove 15 in the radial direction.

Further, since the deep groove 16 includes the side walls 16c and 16d extending in parallel in the radial direction and facing each other and the inner space is sandwiched by the side walls 16c and 16d facing each other in the circumferential direction of the sliding surface S, the sealed fluid F is easily held in the deep groove 16 and the sealed fluid F can be stably supplied to the dynamic pressure generation groove 15.

Further, the width of the inlet 16a of the deep groove 16 is formed to be smaller than the width of the inlet 15a of the dynamic pressure generation groove 15. Specifically, the width of the inlet 16a of the deep groove 16 is preferably a half or less of the width of the inlet 15a of the dynamic pressure generation groove 15 and is about ⅕ in this embodiment. In addition, the depth of the deep groove 16 is ten times or more the depth of the dynamic pressure generation groove 15. Accordingly, since the deep groove 16 is a deep groove having a small width, a high pressure is not easily generated by the shearing force between the sliding surfaces S in the entire deep groove 16 since only the sealed fluid F is moved by the shearing force between the sliding surfaces S only on the surface layer thereof when the rotating seal ring 3 and the stationary seal ring 6 rotate relative to each other while ensuring the size of the inner space of the deep groove sufficient for holding the sealed fluid F.

Further, as understood from FIG. 2, the deep groove 16 is formed such that the circumferential width is shorter than the radial length. Accordingly, since the deep groove 16 is short in the circumferential direction, a dynamic pressure due to the relative rotation of the rotating seal ring 3 and the stationary seal ring 6 is not easily generated in the deep groove 16 and the sealed fluid F is easily held in the deep groove 16.

Further, each of the inlet 16a of the deep groove 16 and the inlet 15a of the dynamic pressure generation groove 15 communicates with the side of the sealed fluid F. That is, since the inlet 15a of the dynamic pressure generation groove 15 which is a shallow groove opens to the side of the sealed fluid F so that the sealed fluid F is stably supplied from the deep groove 16 to the dynamic pressure generation groove 15, the dynamic pressure generation groove 15 can be formed with a length sufficient to efficiently generate a high pressure due to the shearing force between the sliding surfaces S.

Additionally, in the above-described embodiment, a case has been described in which the dynamic pressure generation groove 15 and the deep groove 16 formed on the sliding surface S of the stationary seal ring 6, but the present invention is not limited thereto. For example, these grooves may be formed on the sliding surface S of the rotating seal ring 3.

Additionally, the dynamic pressure generation groove 15 is not limited to the linear shape, but may be formed in for example, a curved shape including a component extending in the circumferential direction and a component extending in the radial direction. Here, the dynamic pressure generation groove may be formed such that the component extending in the circumferential direction is larger and may be formed to protrude toward the outer circumferential edge side of the stationary seal ring 6.

Additionally, since the dynamic pressure generation groove 15 may be formed in a shape in which a dynamic pressure is not easily generated at the closed end 15b when driving the rotary machine, the dynamic pressure generation groove may be formed in a linear shape in the radial direction.

Additionally, in the above-described embodiment, a case has been described in which a gas exists on the leakage side of the sliding surface S and a liquid exists on the side of the sealed fluid F, but the present invention is not limited thereto. For example, a gas or a liquid may exist in all of the leakage side and the sealed fluid side.

Further, in the above-described embodiment, a case has been described in which the sealed fluid F corresponding to the high-pressure fluid exists on the outer circumferential side of the sliding surface S and the atmosphere A corresponding to the low-pressure fluid exists on the inner circumferential side, but the present invention is not limited thereto. For example, the fluids existing on the sealed fluid side and the leakage side of the sliding surface S may have the same pressure.

Additionally, in the above-described embodiment, the deep groove 16 communicates in parallel along the side wall 15c of the dynamic pressure generation groove 15 in the radial direction, but the deep groove 16 is not limited to the above-described configuration if the deep groove is located on the side of the side wall 15c circumferentially opposite to the side wall 15d generating a dynamic pressure in the dynamic pressure generation groove 15.

Figure 6:
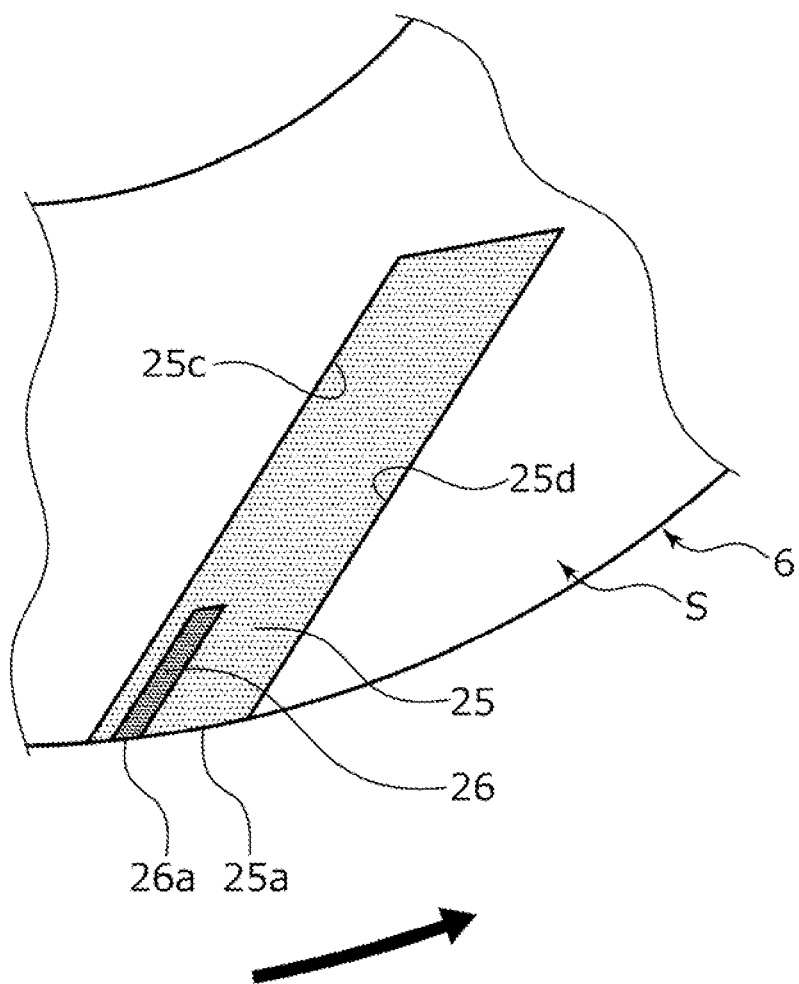
FIG. 6 is a main enlarged view in which a stationary seal ring of a first modified example in the first embodiment is viewed from a sliding surface side.

For example, as in a first modified example illustrated in FIG. 6, the deep groove 26 may include an inlet 26a on the side of a side wall 25c circumferentially opposite to a dynamic pressure generation wall 25d in relation to a center in an inlet of a dynamic pressure generation groove 25 and may be disposed within the width direction of the dynamic pressure generation groove 25.

Figure 7:
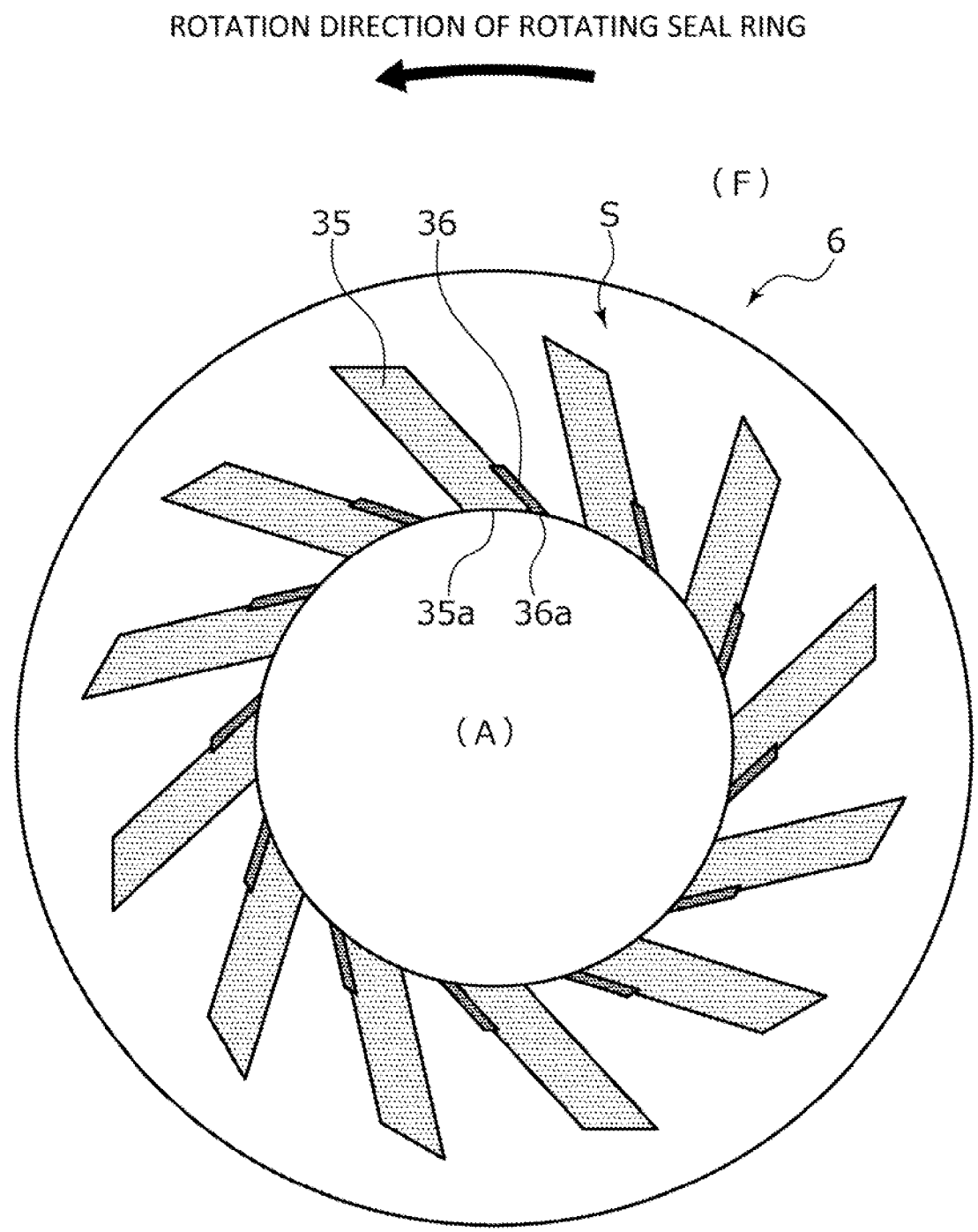
FIG. 7 is a view in which a stationary seal ring of a second modified example in the first embodiment is viewed from a sliding surface side.

Further, as in a second modified example illustrated in FIG. 7, the sliding component may be applied to an outside type which is a type that seals a fluid that tends to leak from the inner circumferential side of the sliding surface S toward the outer circumferential side thereof. In this case, the dynamic pressure generation groove 35 and the deep groove 36 are formed such that the inlet 35a and the inlet 36a communicate with the inner circumferential side of the sliding surface S.

Second Embodiment

Next, sliding components according to a second embodiment of the present invention will be described with reference to FIG. 8. In addition, a description for the overlapping configuration in the same configuration as that of the above-described embodiment will be omitted.

Figure 8:
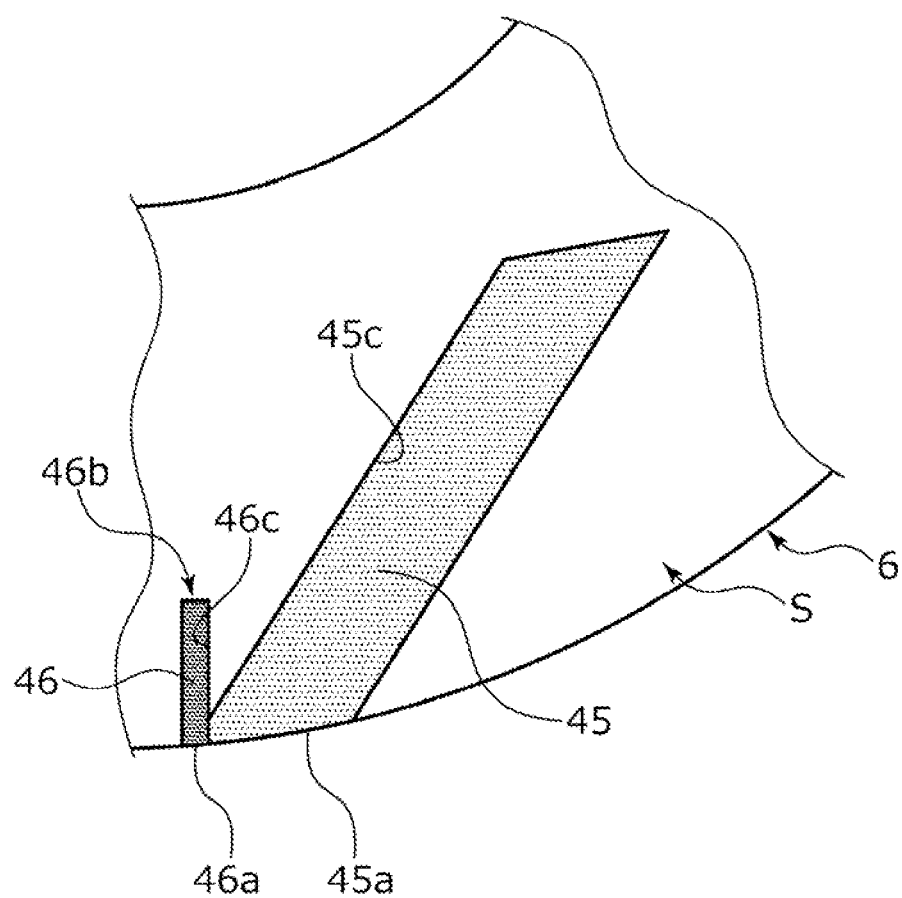
FIG. 8 is a main enlarged view in which a stationary seal ring as a sliding component according to a second embodiment of the present invention is viewed from a sliding surface side.

As illustrated in FIG. 8, an inlet 46a of a deep groove 46 communicates with an inlet 45a of a dynamic pressure generation groove 45. Further, the deep groove 46 extends in a direction different from the inclined direction of the dynamic pressure generation groove 45 and a closed end 46b and a side wall 46c are formed to be separated from a side wall 45c of the dynamic pressure generation groove 45. Accordingly, since the deep groove 46 and the dynamic pressure generation groove 45 communicate with each other only in the vicinity of the inlet 46a and the inlet 45a, the influence of the movement of the sealed fluid F generated inside the dynamic pressure generation groove 45 during the relative rotation of the rotating seal ring 3 and the stationary seal ring 6 on the inside of the deep groove 46 is small. As a result, the sealed fluid F is easily held in the deep groove 46 and the sealed fluid F can be stably supplied to the dynamic pressure generation groove 45.

Although the embodiments of the present invention have been described with reference to the drawings, the specific configuration is not limited to these embodiments and any changes or additions that do not deviate from the gist of the present invention are included in the present invention.

For example, a case has been described in which the sliding component of the above-described embodiments constitutes the mechanical seal, but the present invention is not limited thereto. For example, the sliding component can be used in a thrust bearing.

Further, the deep groove is not limited to a configuration in which the width is the same from the inlet to the closed end and may have, for example, a configuration in which the width gradually decreases from the inlet to the closed end.

Further, the deep groove is not limited to a configuration in which the depth is the same from the inlet to the closed end and may have, for example, a configuration in which the width gradually decreases from the inlet to the closed end.

Further, a plurality of deep grooves may be formed in the circumferential direction as long as the inlet communicates with the dynamic pressure generation groove.

REFERENCE SIGNS LIST

1 Rotation shaft
2 Sleeve
3 Rotating seal ring (sliding component)
4 Housing
5 Seal cover
6 Stationary seal ring (sliding component)
7 Biasing member
11 Inlet
15 Dynamic pressure generation groove
15a Dynamic pressure generation groove inlet
15b Closed end
15c Side wall
15d Side wall (dynamic pressure generation wall)
15e Bottom surface
15f Wall
15h Tip portion
16 Deep groove
16a Deep groove inlet
16b Closed end
16c Side wall
16d Side wall
16e Bottom surface
20 Land portion
25 Dynamic pressure generation groove
26 Deep groove
35 Dynamic pressure generation groove
36 Deep groove
45 Dynamic pressure generation groove
46 Deep groove
46b Closed end
S Sliding surface

The invention claimed is:

1. A sliding component formed in an annular shape and disposed at a relatively rotating position of a rotary machine, the sliding component comprising: a dynamic pressure generation groove provided in a sliding surface of the sliding component, the dynamic pressure generation groove having a first end forming a closed end and a second end forming an inlet communicating with any one side of a sealed fluid side and a leakage side in a radial direction; and a deep groove provided in the sliding surface and deeper than the dynamic pressure generation groove, an inlet of the deep groove communicating with the inlet of the dynamic pressure generation groove on a side of a side wall of the dynamic pressure generation groove, the side wall being circumferentially opposite to a dynamic pressure generation wall constituting another side wall of the dynamic pressure generation groove, wherein the deep groove is shorter in radial length than the side wall of the dynamic pressure generation groove circumferentially opposite to the dynamic pressure generation wall of the dynamic pressure generation groove, and wherein the dynamic pressure generation groove is circumferentially wider than the deep groove.

2. The sliding component according to claim 1, wherein the deep groove communicates with the dynamic pressure generation groove along the side wall circumferentially opposite to the dynamic pressure generation wall of the dynamic pressure generation groove in the radial direction.

3. The sliding component according to claim 1, wherein the deep groove includes wall portions extending radially and facing each other.

4. The sliding component according to claim 1, wherein the deep groove is formed such that a circumferential width of the deep groove is shorter than a radial length of the deep groove.

5. The sliding component according to claim 1, wherein a width of the inlet of the deep groove is half or less of a width of the inlet of the dynamic pressure generation groove.

6. The sliding component according to claim 1, wherein a depth of the deep groove is ten times or more than a depth of the dynamic pressure generation groove.

7. The sliding component according to claim 2, wherein the deep groove includes wall portions extending radially and facing each other.

8. The sliding component according to claim 2, wherein the deep groove is formed such that a circumferential width of the deep groove is shorter than a radial length of the deep groove.

9. The sliding component according to claim 2, wherein a width of the inlet of the deep groove is half or less of a width of the inlet of the dynamic pressure generation groove.

10. The sliding component according to claim 2, wherein a depth of the deep groove is ten times or more than a depth of the dynamic pressure generation groove.

11. The sliding component according to claim 3, wherein the deep groove is formed such that a circumferential width of the deep groove is shorter than a radial length of the deep groove.

12. The sliding component according to claim 3, wherein a width of the inlet of the deep groove is half or less of a width of the inlet of the dynamic pressure generation groove.

13. The sliding component according to claim 3, wherein a depth of the deep groove is ten times or more than a depth of the dynamic pressure generation groove.

14. The sliding component according to claim 4,
wherein a width of the inlet of the deep groove is half or less of a width of the inlet of the dynamic pressure generation groove.

15. The sliding component according to claim 4,
wherein a depth of the deep groove is ten times or more than a depth of the dynamic pressure generation groove.

16. The sliding component according to claim 5,
wherein a depth of the deep groove is ten times or more than a depth of the dynamic pressure generation groove.

\* \* \* \* \*